(12) United States Patent
Slavik

(10) Patent No.: US 11,881,926 B2
(45) Date of Patent: Jan. 23, 2024

(54) CURRENT-MEASURING DEVICE

(71) Applicant: Rohde & Schwarz GmbH & Co. KG, Munich (DE)

(72) Inventor: Jindrich Slavik, Freising (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 320 days.

(21) Appl. No.: 17/060,332

(22) Filed: Oct. 1, 2020

(65) Prior Publication Data

US 2021/0211186 A1 Jul. 8, 2021

(30) Foreign Application Priority Data

Jan. 2, 2020 (EP) .................................... 20150062

(51) Int. Cl.
*H04B 7/185* (2006.01)
*G06F 3/16* (2006.01)
*H04M 7/00* (2006.01)
*H04R 1/08* (2006.01)
*G08G 5/00* (2006.01)

(52) U.S. Cl.
CPC ......... *H04B 7/18506* (2013.01); *G06F 3/162* (2013.01); *H04M 7/006* (2013.01); *H04R 1/08* (2013.01); *G08G 5/0021* (2013.01)

(58) Field of Classification Search
CPC ............. H04B 7/18506; G08G 5/0021; G08G 5/0013; H04R 1/08; H04M 7/006; G06F 3/162
See application file for complete search history.

(56) References Cited

U.S. PATENT DOCUMENTS

| 6,477,370 | B1 | 11/2002 | Sigler et al. |
| 6,636,721 | B2 | 10/2003 | Threadgill et al. |
| 8,862,071 | B2 * | 10/2014 | Ulloa-Sanzo ...... H04B 7/18506 455/73 |
| 9,037,169 | B2 | 5/2015 | Cabos |
| 10,157,616 | B2 | 12/2018 | Agarwal et al. |

(Continued)

FOREIGN PATENT DOCUMENTS

| CA | 2261410 C | 5/2004 |
| EP | 3336838 A1 | 6/2018 |

OTHER PUBLICATIONS

Extended European Search Report for European Patent Application No. 20150062.6, dated Jul. 14, 2020, 8 pages.

*Primary Examiner* — Oussama Roudani
(74) *Attorney, Agent, or Firm* — Westman, Champlin & Koehler, P.A.

(57) ABSTRACT

The present invention relates to an airborne communication apparatus for or within an aircraft, a corresponding airborne communication system and a method of providing secure communication to and from the aircraft. The present invention is based on the concept of providing a redundant communication link from the ground station to the aircraft. The redundant communication link comprises a first communication link and at least a second different communication link, of which the first one is a conventional analogue communication link and the second one is a VoIP-based communication link. Due to the communication redundancy, the communication becomes more secure since the existence of a dual connection increase the availability of the communication link significantly.

17 Claims, 2 Drawing Sheets

(56) References Cited

U.S. PATENT DOCUMENTS

| | | | |
|---|---|---|---|
| 10,879,997 B2* | 12/2020 | Saxena | H01Q 1/282 |
| 2004/0162067 A1 | 8/2004 | Stefani et al. | |
| 2004/0266344 A1* | 12/2004 | Zafar | H01Q 5/40 |
| | | | 455/13.3 |
| 2006/0046715 A1 | 3/2006 | Burgemeister | |
| 2008/0187153 A1* | 8/2008 | Lin | G10L 19/005 |
| | | | 375/349 |
| 2009/0023394 A1* | 1/2009 | Ulloa-Sanzo | H04B 7/18506 |
| | | | 455/73 |
| 2009/0298451 A1* | 12/2009 | Malaga | H04B 7/18506 |
| | | | 455/129 |
| 2010/0027768 A1* | 2/2010 | Foskett | G08G 5/0013 |
| | | | 704/235 |
| 2010/0234024 A1* | 9/2010 | McGuffin | H04B 7/18506 |
| | | | 455/436 |
| 2013/0029701 A1* | 1/2013 | Cabos | H04L 51/58 |
| | | | 455/466 |
| 2018/0054508 A1* | 2/2018 | Yamkovoy | H04B 1/385 |
| 2018/0174588 A1* | 6/2018 | Agarwal | G10L 15/26 |
| 2019/0156681 A1 | 5/2019 | Whiting et al. | |
| 2019/0207670 A1* | 7/2019 | Toillon | H04L 43/10 |
| 2020/0152212 A1* | 5/2020 | Carro | H04B 7/18506 |

* cited by examiner

CURRENT-MEASURING DEVICE

CROSS-REFERENCE TO RELATED APPLICATION(S)

This application claims priority to European Patent Application No. 20150062.6, filed Jan. 2, 2020, the content of which is hereby incorporated by reference in its entirety.

FIELD OF THE INVENTION

The present invention relates to an airborne communication apparatus for or within an aircraft. The present invention further relates to an airborne communication system and to a method of providing secure communication to and from the aircraft.

TECHNICAL BACKGROUND

During a flight of an aircraft or on ground, messages such as notices to pilots, weather data, pilot reports, engine exceedance events are exchanged between the aircraft and the ground station. Text messages are also used by pilots to notify their destination of any delays, maintenance issues, or special requirements on arrival such as catering for wheelchair passengers or for ordering further services such as ordering fuel. For airborne communication purposes, a wireless communication link is established between the ground station and the airplane. A network of Remote Ground Stations (RGS) ensures that the aircraft can communicate with their airline operations base (ATC) from almost anywhere in the world.

The connection from a ground station to the cockpit is currently mainly done via analogue modulated (AM) radio signals. The analogue communication to the cockpit does not allow much additional functionality and the voice quality is to some extent quite poor. In addition, the analogue communication can also be disrupted, interfered, intercepted or in the worst case used by unauthorized persons.

A new technology called LDACS is intended to solve the limitations connected with the above mentioned AM communication. LDACS stands for L-band Digital Aeronautical Communications System and is directed to a ground-based, digital transmission method that shall make air traffic communication safer. LDACS provides a universally usable interface for data and voice in the L-band which is already used for aviation and which enables voice communication in CD quality as well as fast data exchange. Communication at L-band frequencies is done via a number of satellite beams which together cover a service area. The satellite beams are sufficiently strong to permit voice and data communications using inexpensive mobile terminals. With LDACS technology, pilots and ground stations can communicate better and more efficient. This new LDACS-based technology is currently being developed, however, its commercial adoption is not guaranteed. In addition, significant investments are needed by the air navigation service providers (ANSP) for the implementation of this technology.

U.S. Pat. No. 9,037,169 B2 describes an airborne message transmission device for transmitting an SMS message of a mobile device from an aircraft to a ground station.

SUMMARY OF THE INVENTION

Against this background, there is the need to provide a simple and more secure communication between the ground station and an aircraft.

According to the invention, an airborne communication apparatus, an airborne communication system and a method having the features of the independent claims are provided.

According thereto, the following is provided:

An airborne communication apparatus for or within an aircraft, the airborne communication apparatus comprising: at least one aircraft radio unit which is configured to receive and transmit as well voice over IP (VoIP) communication signals and analogue communication signals, the aircraft radio unit further comprising: an audio interface which is connectable to an audio unit for an aircraft crew member and a evaluation unit which is configured to evaluate the received VoIP communication signals and the received analogue communication signals and to decide based on at least a first criterion whether the received VoIP communication signals or the received analogue communication signals is forwarded via the audio interface to the audio unit.

An airborne communication system, the airborne communication system comprising:

an aircraft comprising: at least one audio unit for an aircraft crew member, and an airborne communication apparatus according to the invention, wherein the airborne communication apparatus is connected via its audio interface to the at least one audio unit;

a ground station coupled with the aircraft via a communication link, the ground station comprising: at least one communication device which is configured to transmit VoIP communication signals and analogue communication signals to the aircraft via the communication link.

In an airborne communication system, in particular in an airborne communication system according to the present invention, comprising at least one aircraft and a ground station coupled to the at least one aircraft via a communication link, a method of providing secure communication to and from the aircraft, the method comprising the steps of:

generating and transmitting, by a ground station, as well a VoIP communication signal and an analogue communication signals based on the same audio signal;

receiving, by the aircraft, the transmitted VoIP communication signal and analogue communication signal;

evaluating the received VoIP communication signal and the received analogue communication signal in view of a first criterion and selecting the received signal that fits best the first criterion; and forwarding only the selected signal to an audio unit of an aircraft crew member.

The present invention is based on the concept of providing a redundant communication link from the ground station to the aircraft (and vice versa). Due to the redundancy, the communication becomes more secure since the existence of a dual connection increases the availability of the communication significantly.

The redundant communication link comprises a first communication link and at least a second different communication link, of which the first one is a conventional analogue communication link and the second one is a VoIP-based communication link. Since telecommunication providers are currently launching LTE based aeronautical data networks which are bringing broadband IP connection into the aircraft, the idea of the present invention is to use this IP-based communication link for establishing a redundant VoIP communication link to and from the aircraft. A dedicated evaluation unit decides which one of the communication signals is eventually transferred to the crew member's radio unit. This decision may be taken on the basis of various (more or less complex) criteria.

The present invention provides a new hybrid airborne radio which primarily establishes a communication link with the ground station via VoIP and as such enables a very clear voice communication between the ground station and the crew members of an aircraft. As a fallback mechanism—in case a VoIP communication is not possible, not established or of poor quality—the conventional (redundant) AM communication link will be used. Since modern aircraft are equipped with IP based aeronautical data networks anyway, the benefit of the present invention is that existing technology and implementations may be used so that for the establishment of the redundant communication links basically no new infrastructure has to be implemented, neither in the aircraft nor on this side of the ground station.

The IP communication to and from the aircraft can be established via LDACs, LTE, 5G, future radio communication standards, satellite, etc.

The present invention is in particular advantageous in civil passenger and cargo aircrafts, as these aircrafts are often equipped with IP communication capability anyway. However, the invention may also be used for military purposes in or far military aircrafts or helicopters.

Advantageous configurations and developments emerge from the further dependent claims and from the description with reference to the figures of the drawings.

In a particular preferred embodiment, the audio unit comprises a microphone for recording an audio signal. The aircraft radio unit comprises a transmitter connected to the microphone, wherein the transmitter is configured to convert the recorded audio signal into as well a VoIP communication signal and an analogue communication signal. The evaluation unit is configured to transmit via the transmitter either the converted VoIP communication signal or the converted analogue communication signal. Which of the signals is being transmitted is based on a decision based on at least one second criterion.

In one preferred configuration, the analogue communication signals are analogue modulated (AM) communication signals. Analog modulation is typically used in order to transfer an analogue baseband (or lowpass) signal, for example an audio signal, over an analogue bandpass channel at a different frequency, for example over a limited radio frequency band. Analog modulation facilitates frequency division multiplexing (FDM). In analogue modulation, the modulation is applied continuously in response to the analogue communication signal. Common analogue modulation techniques include amplitude modulation, such as double-sideband modulation (DSB), single-sideband modulation (SSB), quadrature amplitude modulation (QAM), or angle modulation, such as frequency or phase modulation.

In a preferred embodiment, the audio unit is the audio unit of a cockpit crew member, in particular the pilot's or co-pilot's audio unit. According to the present redundant communication concept and the provision of an additional VoIP link, the communication to the cockpit will be clearer and most stable. The pilot can be confident that he always has a secure and reliable audio connection to the ground station, which is especially helpful in challenging situations, such as turbulences. Additional services to the pilot, such as announcement on its call sign, will also be available. In addition, a data link will have much more data available and will be secured. Also, the confidentiality of the transmission will be guaranteed.

In a preferred embodiment, at least one of the first and/or the second criteria is a predefined quality parameter. The predefined quality parameter may be a function of at least one of:

The signal strengths of the VoIP communication signal and analogue communication signal, respectively: For example, the signal having the highest signal strength may be selected for being transmitted or forwarded;

The signal-to-noise ratio (SNR) of the VoIP communication signal and analogue communication signal, respectively: For example, the signal having the highest SNR is selected for being transmitted or forwarded;

The distortion in the VoIP communication signals and the analogue communication signals, respectively: For example, the signal having the least distortion is selected for being transmitted or forwarded, so that the received audio signal are preferably noise-free and sound crystal clear. Removing distortions may be performed for example by means of a good error correction;

The given technical means: For example, if the aircraft is not equipped with the VoIP capability, then the quality of the VoIP communication signal must be regarded as worse than the analogue signal consequently and the analogue signal is to be selected;

The recording environment of the microphone: For example, if the microphone is in an area with high environmental noise, then the VoIP communication signal use to be preferred as the VoIP technology typically filters the background noise more efficiently;

The transmission path of the VoIP communication signals and the analogue communication signals, respectively: For example, the overall transmission path that offers the best transmission quality should be selected;

The given reproduction means (such as loudspeakers, headphones) for reproducing the audio signals from the VoIP communication signals and the analogue communication signals, respectively: For example, the signal that offers the best quality due to the used reproduction means should be selected.

In one additional configuration, it is also possible to incorporate two or more of the above quality criterion into the selection decision.

It goes without saying, that the quality of speech is after a subjective criterion and hereinafter is to be understood to be the quality of the intelligibility of a human voice when reproduced by technical equipment.

Preferably, but not necessarily, the first and second criteria are the same and preferably a quality criterion is used.

In an additional or alternative, preferred embodiment, at least one of the first and/or second criteria is a predefined preference. For example, in particular for a communication from the ground station to the aircraft, the predefined preference provides for a default setting of selecting the VoIP communication signal for being forwarded to the crew member or the pilot. This default setting is based on the consideration that the VoIP generally provides the better signal quality than the analogue signal. However, the reverse rationale may be possible, too.

In an additional or alternative, preferred embodiment, at least one of the first and/or second criteria is a predefined setting of the aircraft radio unit. For example, a crew member, such as the pilot, may set the aircraft radio unit such that always the VoIP communication signal is being forwarded. This option is based on the consideration that very often the crew members are in possession of some experience with the used technical equipment and should have the ability to select their preferred communication link. The VoIP generally provides the better signal quality than the analogue signal.

It goes without saying that it is possible and also preferable to incorporate two or more of the above mentioned quality, preference and setting criteria into the selection decision.

In one additional configuration the aircraft radio unit is configured to simultaneously receive and/or transmit the VoIP communication signals and analogue communication signals.

In a further embodiment, the VoIP communication signals and analogue communication signals contain at least partially and preferably completely the same information, so that full redundancy is guaranteed.

In a further embodiment, the radio unit is a software defined radio). Software-defined radios (SDR) are a radio communication systems where components that have been traditionally implemented in hardware (such as mixers, filters, amplifiers, modulators, demodulators, detectors, etc). are implemented by means of software on a programmable unit, such as a processor, microcomputer or the like. Software defined radios satisfy the highest security standards, enable network centric operations, and ensure interoperability between all different users. One preferred example of a software defined radio is the software defined airborne radio (SDAR) "Soveron" of the Rohde & Schwarz GmbH which is offering to the users a high-end and high data-rate, IP-based radio. Together with innovative waveforms, it enables simultaneous broadband voice and data transmission and the creation of nationalized solutions.

In a further preferred configuration of the airborne communication system, the communication device comprises a transmit radio unit and an IP link. The transmit radio unit is configured to preferably simultaneously transmit the VoIP communication signals and analogue communication signals to the aircraft via the IP link. Simultaneous transmission is important because of the situation awareness and in view of security issues that the pilot should always have an overview of the complete situation and should be in possession of all necessary information from the ground station.

In a typical preferred configuration, the ground station comprises or consists of one or more air traffic controllers. Air traffic control (ATC) is a service provided by ground-based air traffic controllers who direct aircrafts on the ground and through controlled airspace. ATC can also provide advisory services to aircraft in non-controlled airspace. The primary purpose of ATC worldwide is to prevent collisions, organize and expedite the flow of air traffic. One additional and essential purpose of ATC is to provide information and other support for pilots of aircrafts. For this purpose, air traffic controllers monitor the location of a specific aircraft in his assigned airspace by radar and communicate with the pilots by radio. Depending on the type of flight and the class of airspace, ATC may issue instructions that pilots are required to obey, or advisories (also known as flight information) that pilots may, at their discretion, disregard. In order to guarantee safe aircraft operation, the existence of a safe and reliable communication link between the aircraft and the ATC, such as provided with the present invention, is essential. Also future ATC concepts such as sector free flying may be implemented easily.

According to one embodiment, the method further comprises the steps of: Providing a VoIP communication signal and an analogue communication signal by converting a recorded audio signal of a crew member; Evaluating the provided VoIP communication signal and the provided analogue communication signal in view of at least a second criterion and selecting the provided signal that fits best the second criterion; Transmitting, via a transmitter of the aircraft, the selected signal to the ground station.

According to a further preferred embodiment, in case the aircraft and in particular the transmitter of the aircraft is unable to provide and/or transmit an AM signal, the method further comprises the steps of: Providing a VoIP communication signal by converting a recorded audio signal of a crew member; Transmitting, by the aircraft, only the converted VoIP communication signal to the ground station; Receiving, by the ground station, the transmitted VoIP communication signal; Converting, by the ground station, the received VoIP communication signal into an AM communication signal; Forwarding, by the ground station, the converted AM communication signal to other aircrafts.

Where appropriate, the above-mentioned embodiments, configurations and developments can be combined in a suitable manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

CONTENT OF THE DRAWINGS

The present invention is described in greater detail in the following on the basis of the embodiments shown in the schematic figures of the drawings, in which.

Figure 1:
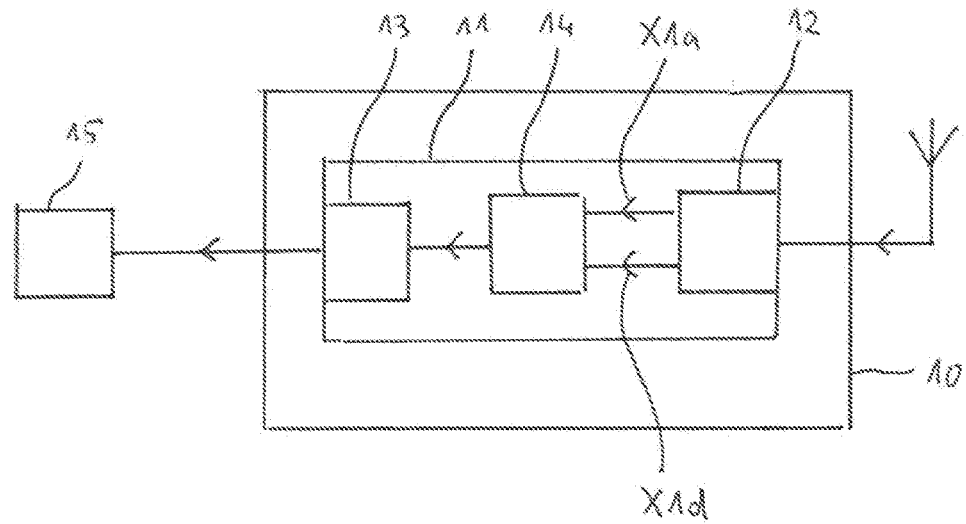
FIG. 1 shows a block diagram of an embodiment of an airborne communication apparatus according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

FIG. 1 shows a block diagram of an embodiment of an airborne communication apparatus according to the present invention. In FIG. 1, the airborne communication apparatus is denoted by reference number 10. The airborne communication apparatus is intended to be used by or within an aircraft.

The airborne communication apparatus 10 comprises at least one aircraft radio unit 11. The radio unit 11 comprises a transceiver 12, an audio interface 13 and a calculation unit 14.

The radio unit 11 is configured to receive and transmit audio signals via the transceiver 12. Preferably, the transceiver 12 is a combined audio and radio transceiver so that the radio unit 11 is capable to as well transmit/receive voice over IP (VoIP) communication signals and analogue communication signals.

The audio interface 13 of the airborne communication apparatus 10 is connected on an input side to the calculation unit 14 of the radio unit 11. In operation, the audio interface 13 is connected on an output side to a crew member's audio unit 15. For example, the audio unit 15 may preferably be the pilot's or co-pilot's headset within the cockpit of the aircraft.

The radio unit 11 further comprises the calculation unit 14. The calculation unit 14 within the radio unit 11 may be any kind of processing unit which is configured to analyse and evaluate signals and data and further to process these signals and data according to a predefined programming Examples of a processor is a microcontroller, processor (such as a CPU, GPU, DSP, ISP, etc), or a programmable logic circuit (such as an FPGA, PLD, etc.). The calculation unit 14 is connected to the transceiver 12 and is configured to evaluate the received VoIP communication signals $X1d$ and the received analogue communication signals $X1a$ received from the transceiver 12. The calculation unit 14 is further configured to decide whether the received VoIP communication signals $X1d$ or the received analogue communication signals $X1a$ are forwarded via the audio interface 13 to the audio unit 15. The decision for the selection is based on at least a first criterion. In particular, the calculation unit 14 calculates whether the received VoIP communication signal $X1d$ or the received analogue communication signal $X1a$ fits better to the first criterion. Typically, only the signal $X1d$, $X1a$ which fits better to the first criterion is then forwarded to the audio unit 15.

Figure 2:
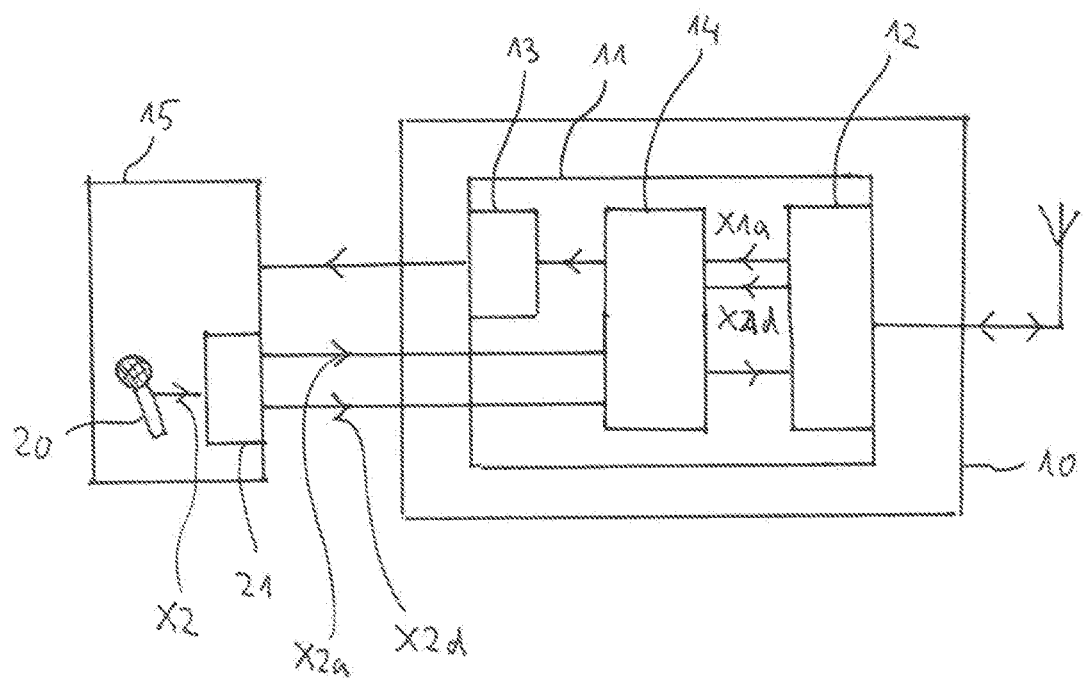
FIG. 2 shows a block diagram of a further embodiment of an airborne communication apparatus according to the present invention.

FIG. 2 shows a block diagram of a second embodiment of an airborne communication apparatus according to the present invention.

In the embodiment in FIG. 2, the audio unit 15 includes a microphone 20 and a transmitter 21 connected to the microphone 21. The microphone 20 is a transducer that converts sound into an electrical signal. In case of a pilot's audio unit 15, the microphone 20 is part of the headset. The transmitter 21 is configured to convert the audio signal $X2$ recorded by the microphone 21 into as well a VoIP communication signal $X2d$ and an analogue communication signal $X2a$.

The calculation unit 14 within the airborne communication apparatus 10 which is connected to the audio unit 15 then decided based on at least one second criterion whether the recorded audio signal $X2$ is to be transmitted via the transmitter 21 to the ground in the form of the converted VoIP communication signal $X2d$ and/or in the form of the converted analogue communication signal $X2a$, such as AM signals.

The first and second criteria may be the same, but may also differ from each other. The first and second criteria may be a predefined quality parameter, such as signal strength, distortion, speech clarity, etc., a predefined preference, such as a preference of VoIP signals over analogue signals, a predefined setting, etc.

Figure 3:
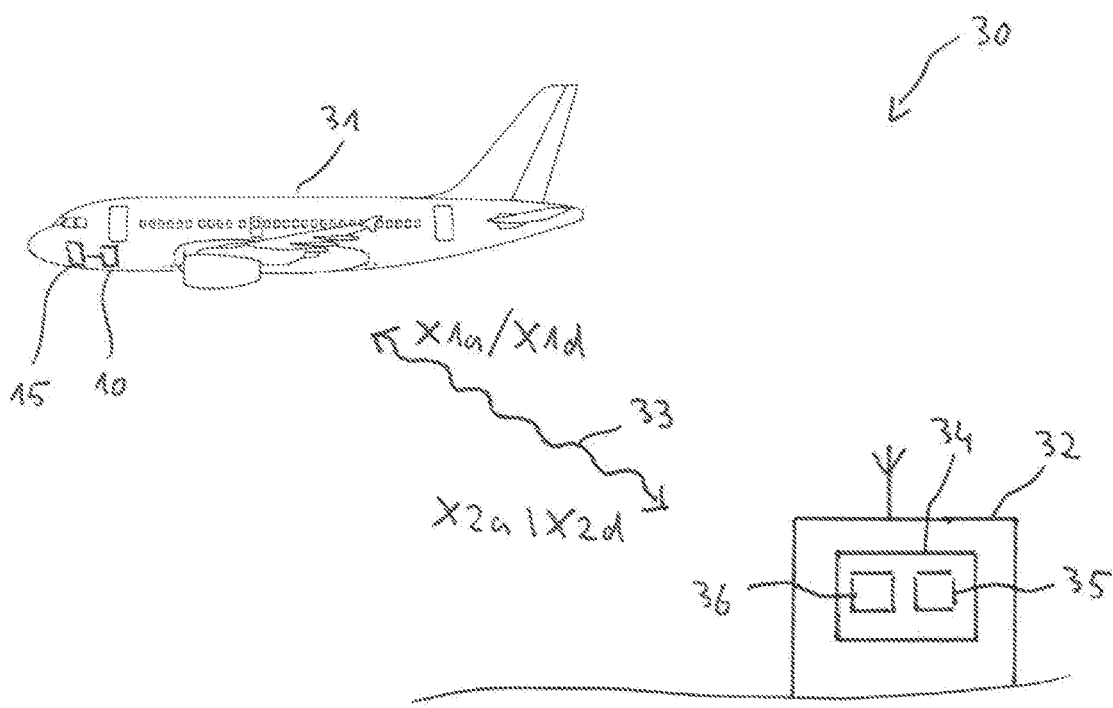
FIG. 3 shows a representation of an embodiment of an airborne communication system according to the present invention.

FIG. 3 shows a representation of an embodiment of an airborne communication system according to the present invention.

The airborne communication system 30 comprises an aircraft 31, such as a civil or cargo aircraft 31, and at least one ground station 32, such as an air traffic controller (ATC).

The aircraft 31 comprises an airborne communication apparatus 10 and at least one audio unit 15 which are each connected to the airborne communication apparatus 10.

The ground station 32 which is coupled with the aircraft 31 via a communication link 33 comprises also a communication device 34. The communication device 34 of the ground station 32 is configured to transmit via the communication link 33 VoIP communication signals $X1d$ and analogue communication signals $X1a$ to the aircraft 31 and to receive communication signals $X2d$ and analogue communication signals $X2a$ from the aircraft 31.

Figure 4:
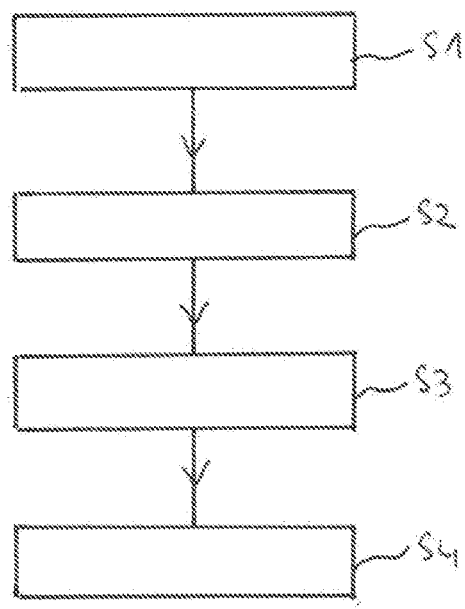
FIG. 4 shows a flow chart of an embodiment of a method of providing secure communication according to the present invention.

FIG. 4 shows a flow chart of an embodiment of a method of providing secure communication to and from the aircraft according to the invention. The method may be implemented in and performed by an airborne communication system 10 according to the present invention, such as shown in FIG. 3. The airborne communication system 10 comprises at least one aircraft 31 and a ground station 32 (such as an ATC) coupled to the at least one aircraft 31 via a communication link 33.

In a first step S1, the ground station provides a VoIP communication signal and an analogue communication signals. These signals are generated based on the same audio signal. The generated VoIP communication analogue communication signals are then transmitted by the ground station, preferably into the direction of a specific aircraft in the air and/or on the ground.

The transmitted VoIP communication signal and analogue communication signal are received by the aircraft in step S2.

In a third step S3, the received VoIP communication signal and the received analogue communication signal are evaluated in an evaluation unit within the aircraft. The evaluation step S3 is done based on a first criterion, for example by evaluation the signal quality of the received VoIP communication signal and the received analogue communication signal. The received signal that fits best a predefined criterion is then selected by the evaluation unit.

Finally, in step S4, only the selected signal is forwarded to the audio unit of an aircraft crew member, such as the pilot or co-pilot.

The forwarding of an audio signal from the aircraft to the ground station may be done in a similar way.

In case, the aircraft is not capable to transmit analogue signals, there is also the possibility that the aircraft transmits only VoIP communication signal to the ground station. The ground station is then able to forward the transmitted VoIP communication signals to other aircrafts after having converted the received VoIP communication signal into an AM communication signal.

Although the present invention has been described in the above by way of preferred embodiments, it is not limited thereto, but rather can be modified in a wide range of ways. In particular, the invention can be changed or modified in various ways without deviating from the core of the invention.

LIST OF REFERENCE SIGNS 10 airborne communication apparatus
11 (aircraft) radio unit, SDR
12 transceiver
13 audio interface
14 calculation unit
15 audio unit
20 microphone
21 transmitter
30 airborne communication system 31 aircraft
32 ground station, ATC
33 communication link
34 communication device
35 transmit radio unit
36 IP link
X2 recorded audio signal
X1d, X2d VoIP communication signals
X1a, X2a analogue communication signals, AM signals
S1-S4 method steps

The invention claimed is:

1. An airborne communication apparatus for or within an aircraft, the airborne communication apparatus comprising:
   at least one aircraft radio unit having a transceiver in communication with a ground location and providing a redundant communication link, such that the transceiver is configured to redundantly receive and transmit simultaneously voice over IP, VoIP, communication signals and analogue communication signals based on a same audio signal, the aircraft radio unit further comprising:
      an audio interface which is connectable to an audio unit for audible communication with a crew member of the aircraft; and
      a calculation unit coupled to the transceiver and the audio interface which is configured to:
         receive the VoIP communication signals by a transmit radio unit of the transceiver and the analogue communication signals by an IP link of the transceiver simultaneously,
         evaluate the received VoIP communication signals with a predefined first criterion related to signal quality;
         evaluate the received analogue communication signals with the first criterion;
         select, by an evaluation unit of the transceiver, one of the received VoIP communication signals and received analogue communication signals based upon evaluation of the received VoIP communication signals with a first criterion related to signal quality and the evaluation of the received analogue communication signals with the first criterion; and
         provide the selected one of the received VoIP communication signals and received analogue communication signals to the crew member of the aircraft in audible form through the audio interface and the audio unit.

2. The airborne communication apparatus of claim 1, wherein the audio unit comprises a microphone for recording an audio signal;
   wherein the aircraft radio unit further comprising a transmitter which is connected to the microphone and which is configured to convert the recorded audio signal into as well a VoIP communication signal and an analogue communication signal,
   wherein the calculation unit is configured to decide based on a second criterion whether the recorded audio signal is to be transmitted via the transmitter to the ground in the form of the converted VoIP communication signal or the converted analogue communication signal.

3. The airborne communication apparatus of claim 1, wherein the analogue communication signals are analogue modulated signals.

4. The airborne communication apparatus of claim 1, wherein the audio unit is the audio unit of a cockpit crew member, in particular the pilot's or co-pilot's audio unit.

5. The airborne communication apparatus of claim 1, wherein at least one of the first criterion and second criterion is a predefined quality parameter.

6. The airborne communication apparatus of claim 1, wherein at least one of the first criterion and second criterion is a predefined preference of the aircraft radio unit.

7. The airborne communication apparatus of claim 1, wherein at least one of the first criterion and second criterion is a predefined setting of the aircraft radio unit.

8. The airborne communication apparatus of claim 1, wherein the aircraft radio unit is configured to simultaneously receive the VoIP communication signals and analogue communication signals.

9. The airborne communication apparatus of claim 1, wherein the aircraft radio unit is configured to simultaneously transmit the VoIP communication signals and analogue communication signals.

10. The airborne communication apparatus of claim 1, wherein the VoIP communication signals and analogue communication signals contain at least partially the same information.

11. The airborne communication apparatus of claim 1, wherein the aircraft radio unit is a software defined radio.

12. An airborne communication system, the airborne communication system comprising:
    an aircraft comprising:
       at least one audio unit for communication with an aircraft crew member, and
       an airborne communication apparatus within an aircraft, the airborne communication apparatus comprising: at least one aircraft radio unit providing a reductant communication link which is configured to simultaneously receive and transmit redundant voice over IP (VoIP) communication signals and analogue communication signals based on a same audio signal, the aircraft radio unit further comprising: an audio interface which is connectable to the at least one audio unit for communication with the aircraft crew member and a calculation unit which is configured to:
       receive the VoIP communication signals by a transmit radio unit of the transceiver and the analogue communication signals by an IP link of the transceiver simultaneously,
       evaluate the received VoIP communication signals and a received analogue communication signals based upon a predefined first criterion related to signal quality, and
       to decide based on the evaluations of the received VoIP communication signals with a first criterion related to signal quality and the evaluation of the received analogue communication signals with the first criterion which of the received VoIP communication signals or the received analogue communication signals is forwarded via the audio interface to the audio unit,
       wherein the airborne communication apparatus is connected via its audio interface to the at least one audio unit;
    a ground station in communication with the aircraft via a communication link, the ground station comprising:
       at least one communication device which is configured to receive and transmit VoIP communication signals and analogue communication signals to the aircraft via the communication link.

13. The airborne communication system of claim 12, wherein the communication device comprises a transmit radio unit and an IP link, wherein the transmit radio unit is configured to transmit the VoIP communication signals and analogue communication signals to the aircraft via the IP link.

14. The airborne communication system of claim 12, wherein the ground station is an air traffic controller.

15. In an airborne communication system comprising at least one aircraft and a ground station coupled to the at least one aircraft via a communication link, a method of providing secure communication to and from the aircraft, the method comprising the steps of:
- generating and transmitting by a ground station, redundant VoIP (Voice over IP) and analogue communication signals simultaneously based on a same audio signal;
- receiving at the aircraft the transmitted VoIP communication signal with a transmit radio unit and analogue communication signal with an IP link thereby providing a redundant communication link in which the VoIP communication signal and the analogue communication signal are simultaneously received;
- evaluating the received VoIP communication signal and the received analogue communication signal based upon a predefined first criterion related to signal quality and selecting one of the received VOIP communication signal and received analogue signal that fits best the first criterion; and
- forwarding only the selected signal to an audio unit of an aircraft crew member to thereby communicate with the aircraft crew member.

16. The method according to claim 15, further comprising:
- providing a VoIP communication signal and an analogue communication signal by converting a recorded audio signal of a crew member;
- evaluating the provided VoIP communication signal and the provided analogue communication signal in view of at least a second criterion and selecting the provided signal that fits best the second criterion; and
- transmitting, via a transmitter of the aircraft, the selected signal to the ground station.

17. The method according to claim 15, wherein in case the aircraft or the transmitter of the aircraft is unable to provide or transmit an analogue modulated, AM, signal, the method further comprising:
- providing a VoIP communication signal by converting a recorded audio signal of a crew member;
- transmitting, by the aircraft, only the converted VoIP communication signal to the ground station;
- receiving, by the ground station, the transmitted VoIP communication signal;
- converting, by the ground station, the received VoIP communication signal into an AM communication signal; and
- forwarding, by the ground station, the converted AM communication signal to other aircraft.

* * * * *